United States Patent
Lemaire

(10) Patent No.: US 6,579,595 B2
(45) Date of Patent: Jun. 17, 2003

(54) LIQUID ABSORBING SHEET FOR AN EXUDING FOOD PRODUCT

(75) Inventor: Sylvie Lemaire, Otterburn Park (CA)

(73) Assignee: Fempro Inc., Drummondville (CA)

( * ) Notice: Subject to any disclaimer, the term of this patent is extended or adjusted under 35 U.S.C. 154(b) by 63 days.

(21) Appl. No.: 09/870,564

(22) Filed: May 31, 2001

(65) Prior Publication Data

US 2001/0049006 A1 Dec. 6, 2001

(30) Foreign Application Priority Data

May 31, 2000 (CA) ............................................. 2309803

(51) Int. Cl.$^7$ .............................................. B65D 81/26
(52) U.S. Cl. ...................... 428/174; 428/138; 428/177; 428/179; 206/204; 426/106; 426/124; 426/129
(58) Field of Search ................................ 428/131, 137, 428/138, 140, 174, 177, 178, 179; 206/204; 426/106, 124, 129

(56) References Cited

U.S. PATENT DOCUMENTS

| | | | |
|---|---|---|---|
| 885,778 A | 4/1908 | Neuberger | 239/56 |
| 1,841,889 A | 1/1932 | Grünwald | 204/484 |
| 1,871,419 A | 8/1932 | McKee | 239/34 |
| 2,300,041 A | 10/1942 | Bradley | 47/38 |
| 4,124,116 A | 11/1978 | McCabe, Jr. | 206/204 |
| 4,275,811 A | 6/1981 | Miller | 206/204 |
| 4,410,578 A | * 10/1983 | Miller | 206/204 |
| 4,676,196 A | 6/1987 | Lojek et al. | 119/1 |
| 4,756,939 A | 7/1988 | Goodwin | 428/74 |
| 4,802,574 A | 2/1989 | Akiba | 206/204 |
| 4,861,632 A | * 8/1989 | Caggiano | 206/204 |
| 5,046,604 A | 9/1991 | Forhetz et al. | 206/0.5 |
| 5,552,169 A | * 9/1996 | Kannankeril et al. | 206/204 |
| 5,556,030 A | 9/1996 | Paul | 239/56 |
| 5,611,486 A | 3/1997 | Paul | 239/56 |
| 5,709,897 A | 1/1998 | Pearlstein | 426/106 |
| 5,804,241 A | 9/1998 | Isohata | 426/415 |
| 6,015,582 A | 1/2000 | Kageyama et al. | 426/392 |
| 6,095,325 A | * 8/2000 | Simhaee | 206/204 |

* cited by examiner

Primary Examiner—Harold Pyon
Assistant Examiner—Alicia Chevalier
(74) Attorney, Agent, or Firm—Darby & Darby

(57) ABSTRACT

A liquid absorbing sheet for absorbing liquids exuding from a food product disposed in a container of the type having a bottom wall provided with a furrow extending along a side wall of the container. The absorbing sheet comprises a first absorbing zone centrally located on the sheet and comprising a permeable top layer made of a liquid permeable material, an impermeable bottom layer made of a liquid impermeable layer and an absorbing mat between the top layer and the bottom layer, made of a liquid absorbing material. The sheet further comprises a second absorbing zone having an elongated and narrow configuration adapted to fit over the furrow, and comprising an impermeable top layer made of a liquid impermeable material, a permeable bottom layer made of a liquid permeable material and an absorbing mat between the top and the bottom layer, made of a liquid absorbing material.

22 Claims, 3 Drawing Sheets

LIQUID ABSORBING SHEET FOR AN EXUDING FOOD PRODUCT

FIELD OF THE INVENTION

The present invention relates generally to the field of liquid absorbing sheets used in the packaging and/or preserving of food products that tend to exude juice. More specifically, the present invention concerns a liquid absorbing sheet suitable for use in a container having a bottom wall provided with furrow extending along a side wall thereof and where liquid exuding from the food product tends to accumulate.

BACKGROUND OF THE INVENTION

Already known in the prior art, there are different types of liquid absorbing sheets capable of absorbing liquid exuding from food products such as meat, fish, fruits or vegetables. The known absorbing sheets are often used in the packaging of food products for individually wrapping the food. Often, the food is packed in a shallow container made of polystyrene covered with a plastic film. In order to absorb the exuding liquids, an absorbing sheet is disposed on the bottom of the container, under the food. Commonly used is an absorbing sheet comprising an absorbing mat sandwiched between two layers of a permeable material, such as a perforated plastic film.

Although the known absorbing sheets may be very advantageous when used with a container having a flat bottom wall, they show certain drawbacks when used with a container having a bottom wall with a relief, such as the drawers of a refrigerator or any plastic container of the type marketed by the company Tupperware* or any other type. Those containers with a relief often comprise a furrow extending along a side wall of the container. The liquid that ends in those furrows never gets in contact with the absorbing sheet and is thus never absorbed.

There is thus presently a need for a liquid absorbing sheet suitable adapted for use with a container having a bottom wall provided with a furrow.

Examples of prior art absorbing sheets for exuding food product are given in U.S. Pat. Nos.: 885,778; 1,841,889; 1,871,419; 2,300,041; 4,124,116; 4,275,811; 4,676,196; 4,756,939; 4,802,574; 5,046,604; 5,556,030; 5,611,486; 5,709,897; 5,804,241; 6,015,582.

SUMMARY OF THE INVENTION

An object of the present invention is to provide a liquid absorbing sheet that will satisfy that need.

In accordance with the present invention, that object is achieved with a liquid absorbing sheet for absorbing liquids exuding from a food product, with the sheet to be disposed on a surface of the container with a relief, the absorbing sheet having a top side devised to receive thereon the food product and an underside, and comprising:

a first absorbing zone on which the food product is to be placed for absorbing liquid from the top side of the sheet, the first absorbing zone comprising, from the top side to the underside of the sheet:
a permeable top layer made of a liquid permeable material, an impermeable bottom layer made of a liquid impermeable layer and an absorbing mat between the top layer and the bottom layer, made of a liquid absorbing material; and a second absorbing zone contiguous with said first zone, for absorbing liquid from the underside of the sheet comprising, from the top side to the underside of the sheet:
an impermeable top layer made of a liquid impermeable material, a permeable bottom layer made of a liquid permeable material and an absorbing mat between the top and the bottom layer, made of a liquid absorbing material.

In accordance with another aspect, the present invention also proposes a liquid absorbing sheet for absorbing liquids exuding from a food product with the sheet to be disposed in a container of the type having a bottom wall provided with a furrow extending along a side wall of the container, the absorbing sheet having a top side devised to receive thereon the food product and an underside, and comprising:

a first absorbing zone centrally located on the sheet for absorbing liquid from the top side of the sheet, the first absorbing zone comprising, from the top side to the underside of the sheet:
a permeable top layer made of a liquid permeable material, an impermeable bottom layer made of a liquid impermeable layer and an absorbing mat between the top layer and the bottom layer, made of a liquid absorbing material; and a second absorbing zone contiguous with said first zone, having an elongated configuration adapted to fit over said furrow for absorbing liquid from the underside of the sheet, the second absorbing zone comprising, from the top side of the sheet to the underside:
an impermeable top layer made of a liquid impermeable material, a permeable bottom layer made of a liquid permeable material and an absorbing mat between the top and the bottom layer, made of a liquid absorbing material.

As can be appreciated, and thanks to its different absorbing zones, a liquid absorbing sheet according to the present invention allows the exuded juice that tends to accumulate in the groove or furrow of the bottom wall of a container to be efficaciously absorbed.

BRIEF DESCRIPTION OF THE DRAWINGS

The present invention and its advantages will be more easily understood after reading the following non restrictive description of a preferred embodiment thereof made with reference to the following drawings wherein.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DESCRIPTION OF A PREFERRED EMBODIMENT

Figure 1:
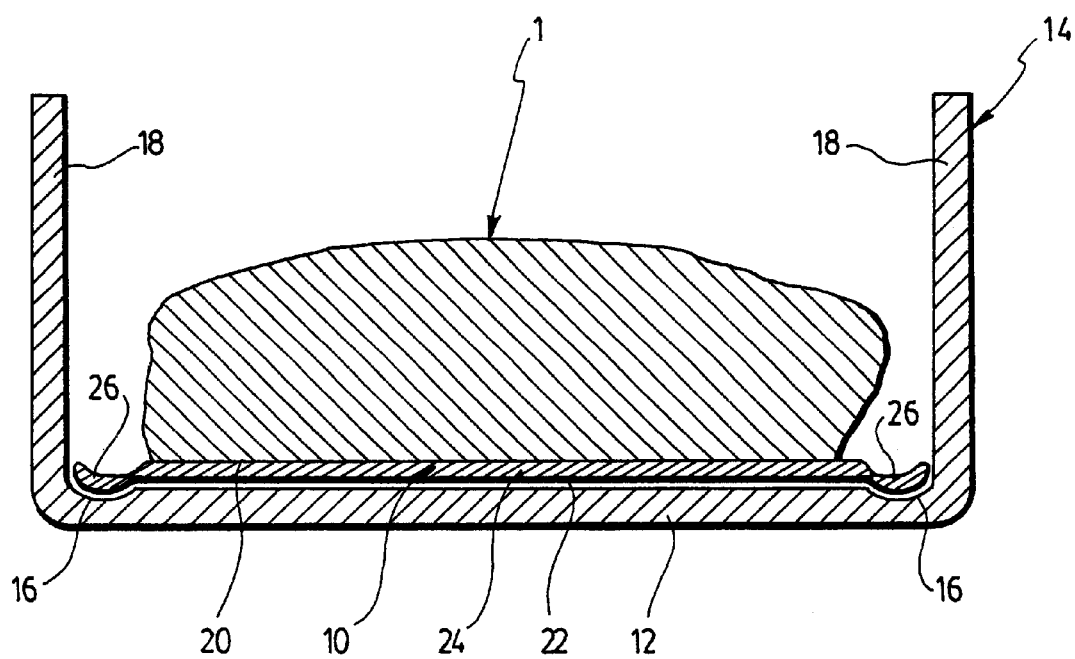
FIG. 1 is a vertical section of a container provided with an absorbing sheet in accordance with a preferred embodiment of the invention.

Referring to FIG. 1, a piece of food product (1) such as a piece of meat, poultry, fish, vegetable or fruit or any other food product which exudes liquids, is shown disposed on a liquid absorbing sheet (10) according to a preferred embodiment of the invention, which in turn is disposed on the bottom wall (12) of a container (14), such as a drawer of a refrigerator, a Tupperware* type plastic container, or any other container with a non-flat bottom wall. Indeed, the bottom wall (12) of the container is not flat, it has a relief formed by a furrow (16) extending along the side wall (18) of the container (14) and where the liquids exuding from the food products tend to accumulate.

Figure 2:
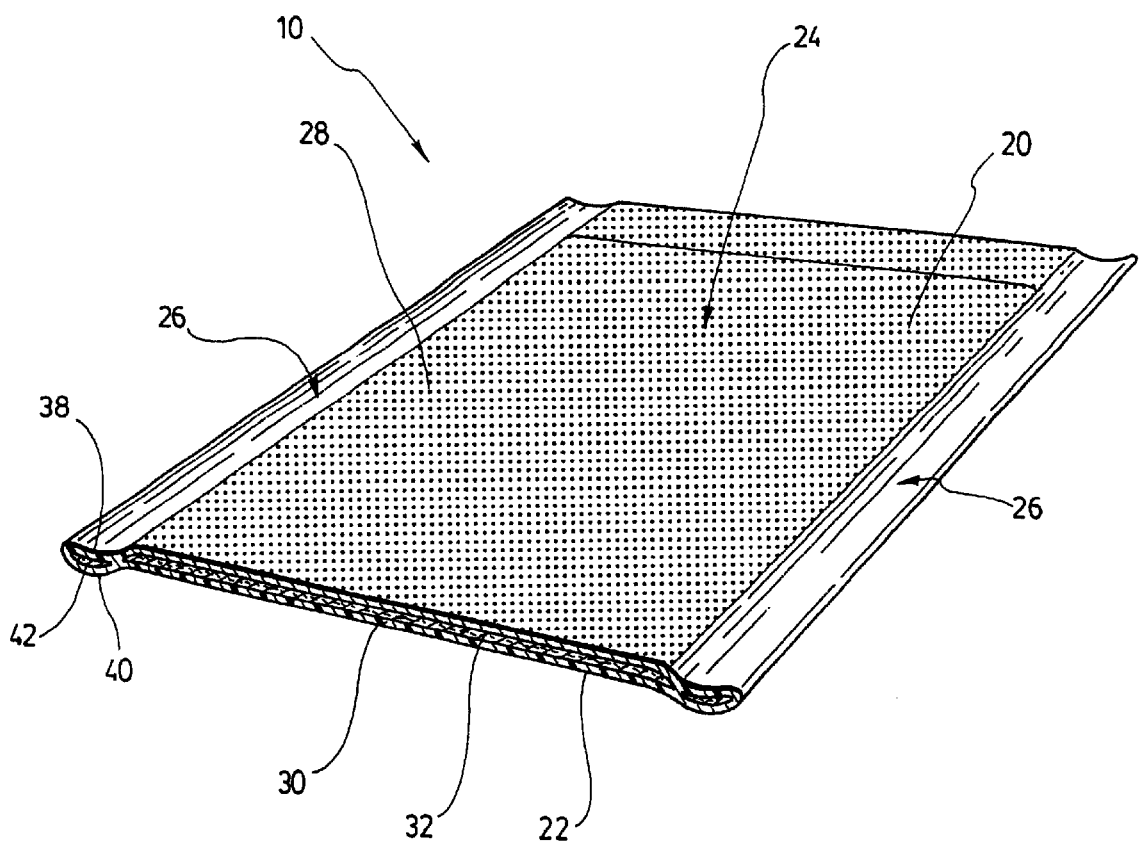
FIG. 2 is a perspective view of the absorbing sheet of FIG. 1.
Figure 3:
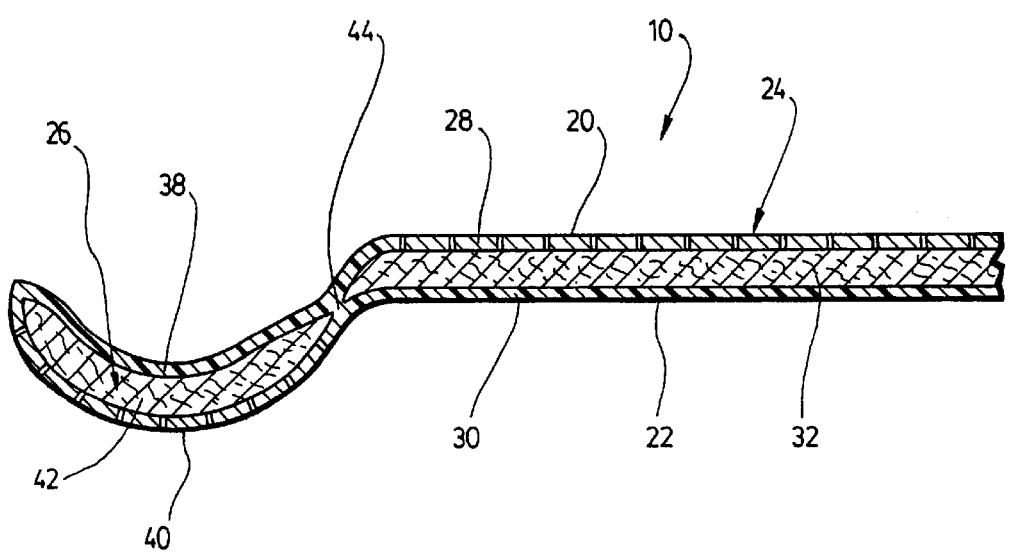
FIG. 3 is a fragmentary sectional view of the liquid absorbing sheet of FIG. 1.

Referring now also to FIGS. 2 and 3, the liquid absorbing sheet (10) has a top side (20) and an underside (22), the top side (20) being devised to receive thereon the food product (1). The absorbing sheet (10) further includes a first absorbing zone (24) and a second absorbing zone (26). In the case where the absorbing sheet (10) is for use with a container (14) having a furrow (16) extending all along the side walls (18) of the container (14), as is usually the case with the drawer of a refrigerator or with many plastic containers of the Tupperware* type, the first absorbing zone (24) is preferably centrally located on the sheet (10) to receive thereon the food product (1) and is completely surrounded by the second absorbing zone (26), or as shown in figure 2, there is an elongated second zone (26) formed along the outer edges of the centrally located first absorbing zone (24).

As best shown in FIG. 3, the first absorbing zone (24) comprises a permeable top layer (28) made of a liquid permeable material, an impermeable bottom layer (30) made of a liquid impermeable layer and an absorbing mat (32) between the top layer (28) and the bottom layer (30), made of a liquid absorbing material. Therefore, the liquid exuding from the food product disposed on the first absorbing zone (24) crosses the top layer (20) and is absorbed by the absorbing mat (32). The exceeding liquid which is not absorbed if the absorbing mat (32) is supersaturated cannot cross the bottom layer (30) and will thus end overflowing in the furrow (18).

As for the second absorbing zone (26), it comprises an impermeable top layer (38) made of a liquid impermeable material, a permeable bottom layer (40) made of a liquid permeable material and an absorbing mat (42) between the top layer (38) and the bottom layer (40), made of a liquid absorbing material. Thus, the overflowed liquid from the first absorbing zone (24) is absorbed in the second absorbing zone (26).

The second absorbing zone (26) preferably has an elongated and narrow configuration with a concave transversal cross section adapted to fit over the furrow (16) of the container (14), as shown in FIG. 1.

Also preferably, a liquid barrier (44) is provided between the first and the second absorbing zone (24,26). The liquid barrier (44) is preferably obtained by a goffering process where the end of the permeable top layer (28) of the first absorbing zone (24) and the end of the impermeable top layer (38) of the second absorbing zone (24) are thermopressed with the end of the permeable bottom layer (40) of the second zone (24) and of the impermeable bottom layer (30) of the first zone (24).

On the top side (20) of the sheet (10), and as long as the absorbant mat (32) of the first absorbing zone (24) is not saturated, the liquid barrier (44) helps keeping the liquids in the centrally located second zone (24), and therefore, helps preventing the liquids from overflowing from the first absorbing zone (24).

The liquid permeable material used in the first zone (24) and in the second zone (26) may be different, but preferably the same material is used. However in both cases, the liquid permeable material is preferably a wet-strength material selected from the group consisting of paper, pulp, nonwoven cloth and perforated plastic film. A wet strength material means a material capable of keeping its cohesion even when wet.

The liquid permeable material in both zones also helps keeping the absorbent mat in one piece, as well as preventing the food product from contacting the cellulose fiber of the absorbing mat.

As can also be appreciated, the liquid permeable material of the surrounding second zone (26) disposed over the furrow (16) allows the liquid overflowing from the top side (20) of the sheet (10) and accumulating in the furrow (16) to be absorbed by the second absorbing zone (26).

The liquid impermeable material used in the first zone (24) and in the second zone (26) may be different, but preferably, the same material is used. However, in both cases, the liquid impermeable material is preferably selected from the group consisting of a synthetic resin film, a water proof process paper and an aluminium foil. More preferably, it is a synthetic resin film selected from the group consisting of polyethylene and polypropylene. Most preferably, propylene is used.

The liquid absorbing sheet used in the first zone (24) and in the second zone (26) may be different, but preferably, the same material is used. In both cases, it is preferably selected from the group consisting of cellulose fiber, rayon fiber and cotton fiber and it has a basis weight of from 65 g/[c]m$^2$ to 300 g/[c]m$^2$. Most preferably, the absorbing mats (32,42) are made of cellulose fibers linked or not linked.

Also preferably, the liquid absorbing material includes at least one additive selected from the group consisting of retention agent, odour control agent and bacteria control agent. It may also contain a chemical agent capable of transforming the absorbed liquid into a gel.

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A liquid absorbing sheet for absorbing liquids exuding from a food product, the absorbing sheet to be disposed on a surface with a relief, the absorbing sheet having a top side to receive thereon the food product and an underside, and comprising:

a first absorbing zone for absorbing liquid from the top of the sheet, the first absorbing zone comprising, from the top side to the underside of the sheet:
a permeable top layer made of a liquid permeable material, an impermeable bottom layer made of a liquid impermeable layer and an absorbing mat between the top layer and the bottom layer, made of a liquid absorbing material; and a second absorbing zone contiguous to said first zone, for absorbing liquid from the underside of the sheet and comprising, from the top side to the underside of the sheet:
an impermeable top layer made of a liquid impermeable material, a permeable bottom layer made of a liquid permeable material and an absorbing mat between the top and the bottom layer, made of a liquid absorbing material;
wherein the permeable top layer of the first zone and the impermeable top layer of the second zone form a continuous topside layer and the impermeable bottom layer of the first zone and the permeable bottom layer of the second zone form a continuous bottom layer.

2. A liquid absorbing sheet as claimed in claim 1, wherein the first absorbing zone, viewed from the top side of the sheet, is centrally located on the sheet.

3. A liquid absorbing sheet as claimed in claim 2, wherein said second absorbing zone extends along the periphery of the centrally located first absorbing zone.

4. A liquid absorbing sheet as claimed in claim 3, wherein the second absorbing zone has a concave transversal cross section.

5. A liquid absorbing sheet as claimed in claim 1 wherein said first zone is elongated and said second zone surrounds the periphery of said first zone.

6. A liquid absorbing sheet as claimed in claim 1 further comprising a liquid barrier between said first and second zones formed by a seal between the top layer of the first zone and the bottom layer of the second zone.

7. A liquid absorbing sheet for absorbing liquids exuding from a food product disposed in a container of the type having a bottom wall provided with a furrow extending along a side wall of the container, the absorbing sheet having a top side to receive thereon the food product and an underside, and comprising:

a first absorbing zone centrally located on the sheet for absorbing liquid from the top side of the sheet, the first absorbing zone comprising, from the top side to the underside of the sheet:
a permeable top layer made of a liquid permeable material, an impermeable bottom layer made of a liquid impermeable layer and an absorbing mat between the top layer and the bottom layer, made of a liquid absorbing material; and a second absorbing zone contiguous to said first zone, and having an elongated configuration adapted to fit over the furrow of the container for absorbing liquid from the underside of the sheet, the second absorbing zone comprising, from the top side of the sheet to the underside:
an impermeable top layer made of a liquid impermeable material, a permeable bottom layer made of a liquid permeable material and an absorbing mat between the top and the bottom layer, made of a liquid absorbing material;
wherein the permeable top layer of the first zone and the impermeable top layer of the second zone form a continuous topside layer and the impermeable bottom layer of the first zone and the permeable bottom layer of the second zone form a continuous bottom layer.

8. A liquid absorbing sheet as claimed in claim 7, wherein the second absorbing zone has a concave transversal cross-section.

9. A liquid absorbing sheet as claimed in claim 8, wherein the second absorbing zone encircles the centrally located first absorbing zone.

10. A liquid absorbing sheet as claimed in claim 9, comprising a liquid barrier between the first and second absorbing zones.

11. A liquid absorbing sheet as claimed in claim 10, wherein the liquid barrier is obtained by a calendering process.

12. A liquid absorbing sheet as claimed in claim 7, wherein the liquid permeable material of the first zone and the second zone is the same.

13. A liquid absorbing sheet as claimed in claim 12, wherein the liquid permeable material is a wet-strength material.

14. A liquid absorbing material as claimed in claim 13, wherein the wet-strength material is selected from the group consisting of paper, pulp, non-woven cloth and perforated plastic film.

15. A liquid absorbing material as claimed in claim 7, wherein the liquid impermeable material of the first zone and the second zone is the same.

16. A liquid absorbing material as claimed in claim 15, wherein, the liquid impermeable material is selected from the group consisting of a synthetic resin film, a water proof process paper and an aluminium foil.

17. A liquid absorbing sheet as claimed in claim 16, wherein the synthetic resin film is selected from the group consisting of polyethylene and polypropylene.

18. A liquid absorbing sheet as claimed in claim 7, wherein the liquid absorbing material of the first zone and the second zone is the same.

19. A liquid absorbing sheet as claimed in claim 18, wherein the liquid absorbing material is selected from the group consisting of cellulose fiber, rayon fiber and cotton fiber.

20. A liquid absorbing sheet as claimed in claim 19, having a basis weight of from 65 $g/m^2$ to 300 $g/m^2$.

21. A liquid absorbing sheet as claimed in claim 18, wherein the liquid absorbing material includes at least one additive selected from the group consisting of retention agent, odour control agent and bacteria control agent.

22. A liquid absorbing sheet as claimed in claim 6 wherein the liquid barrier comprises a seal between the top layer of the first zone and the bottom layer of the second zone.

* * * * *